(12) United States Patent
Braun et al.

(10) Patent No.: US 9,032,790 B2
(45) Date of Patent: May 19, 2015

(54) GAS METER

(75) Inventors: Robert Braun, Holderbank (DE);
Ulrich Eff, Herrieden (DE); Steffen Lacher, Ansbach (DE)

(73) Assignee: HYDROMETER GMBH, Ansbach (DE)

( * ) Notice: Subject to any disclaimer, the term of this patent is extended or adjusted under 35 U.S.C. 154(b) by 226 days.

(21) Appl. No.: 13/822,785

(22) PCT Filed: Sep. 15, 2011

(86) PCT No.: PCT/EP2011/004639
§ 371 (c)(1),
(2), (4) Date: Apr. 15, 2013

(87) PCT Pub. No.: WO2012/045391
PCT Pub. Date: Apr. 12, 2012

(65) Prior Publication Data
US 2013/0199290 A1 Aug. 8, 2013

(30) Foreign Application Priority Data
Oct. 6, 2010 (DE) .......................... 10 2010 047 680

(51) Int. Cl.
*G01F 3/20* (2006.01)
*G01F 1/684* (2006.01)
*G01F 3/22* (2006.01)
*G01F 15/14* (2006.01)
*G01F 15/18* (2006.01)

(52) U.S. Cl.
CPC ............ *G01F 1/6842* (2013.01); *G01F 1/6845* (2013.01); *G01F 3/22* (2013.01); *G01F 15/14* (2013.01); *G01F 15/18* (2013.01)

(58) Field of Classification Search
USPC ............................ 73/272 R, 263–29, 204.226
See application file for complete search history.

(56) References Cited

U.S. PATENT DOCUMENTS

| 4,014,212 A | * | 3/1977 | Douglas .......................... 73/267 |
| 4,091,668 A | * | 5/1978 | Namikawa et al. ............. 73/263 |
| 4,142,413 A | * | 3/1979 | Bellinga .......................... 73/198 |
| 4,437,347 A | * | 3/1984 | Bronsky et al. ............ 73/272 R |
| 4,565,090 A | * | 1/1986 | Gotanda .......................... 73/198 |
| 4,706,496 A | * | 11/1987 | Hicks .............................. 73/268 |

(Continued)

FOREIGN PATENT DOCUMENTS

| CN | 101126652 A | 2/2008 |
| DE | 102004021304 A1 | 11/2005 |

(Continued)

OTHER PUBLICATIONS

International Search Report dated Jan. 10, 2012 directed to PCT/EP2011/004639.

*Primary Examiner* — Jewel V Thompson
(74) *Attorney, Agent, or Firm* — Scully, Scott, Murphy & Presser, PC

(57) ABSTRACT

A gas meter comprising a meter housing with a gas inlet with associated connecting piece for a gas supply line and a gas outlet with associated connecting piece for a gas discharge line, wherein the meter housing (2) is a bellows gas meter housing in which a measuring device (12) comprising a housing (13) with an integrated micro-thermal flow measuring sensor (20) is arranged on the gas outlet (11), which housing (13) is connected in a gas-tight manner to the connecting piece (10) on the outlet side or to the meter housing (2) in the area of the gas outlet (11).

11 Claims, 3 Drawing Sheets

(56) References Cited

U.S. PATENT DOCUMENTS

Figure 1:
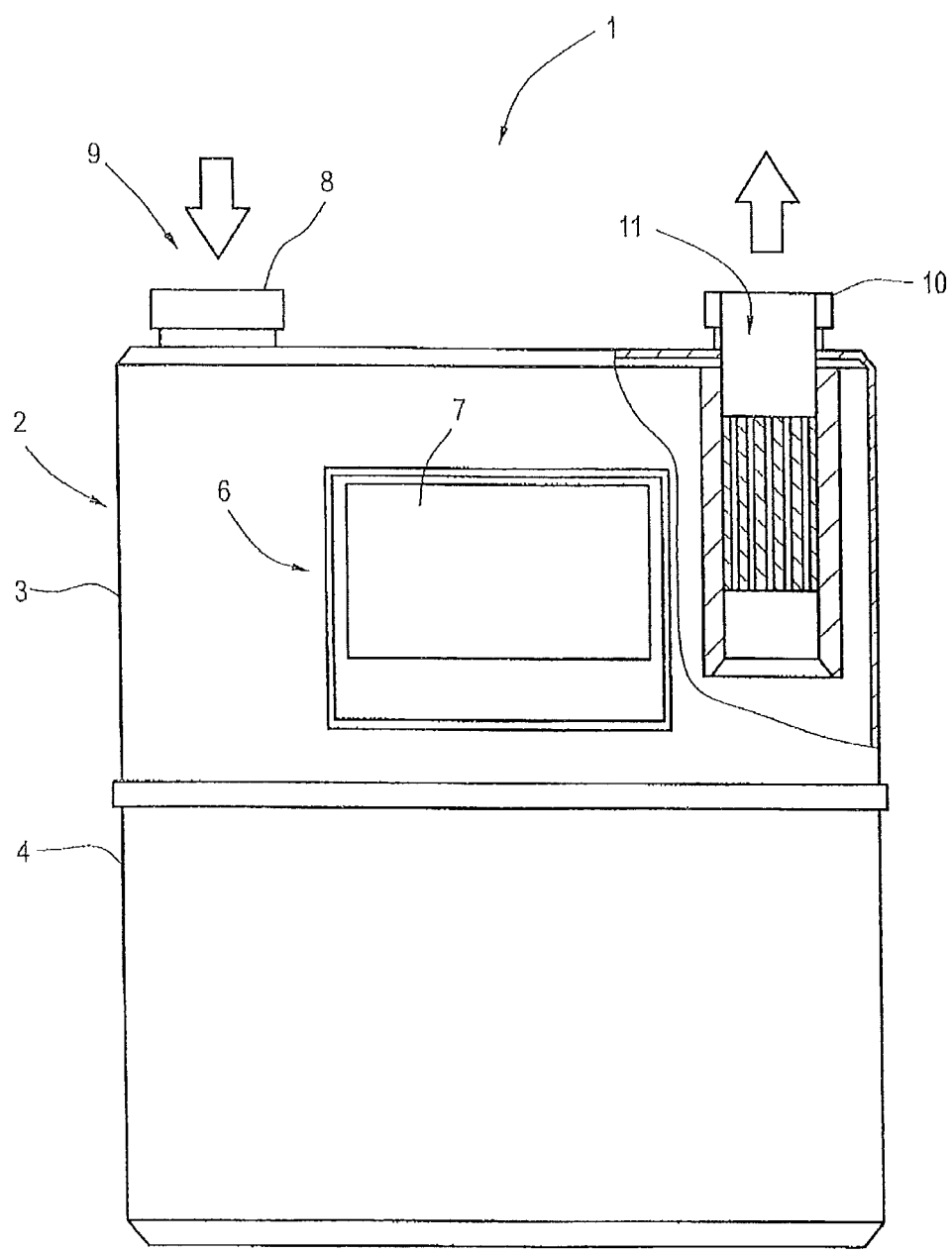

| | | | | |
|---|---|---|---|---|
| 4,769,135 | A | * | 9/1988 | Norton .......................... 210/88 |
| 4,856,331 | A | * | 8/1989 | Roese et al. ................... 73/268 |
| 6,655,207 | B1 | | 12/2003 | Speldrich et al. |
| 2008/0163683 | A1 | | 7/2008 | Becke et al. |
| 2009/0153357 | A1 | | 6/2009 | Bushman et al. |

FOREIGN PATENT DOCUMENTS

| | | |
|---|---|---|
| DE | 102005022437 A1 | 11/2006 |
| WO | WO0198736 A1 | 12/2001 |

\* cited by examiner

GAS METER

The invention relates to a gas meter comprising a meter housing with a gas inlet with associated connecting piece for a gas supply line and a gas outlet with associated connecting piece for a gas discharge line.

In order to measure the consumption of combustible gases, bellows gas meters are used in most households. Such a bellows gas meter comprises a relatively large-volume meter housing, in which there is arranged a mechanical measuring insert which operates on the principle of the displacement method and is able to measure a gas volume when operating. The mechanical measuring insert comprises one or more diaphragms, via which measuring chambers separated from one another are formed. These measuring chambers are periodically filled and emptied. Via the diaphragm movement, two sliders which control the gas flow are driven via a mechanism. Thus, the gas flow is guided alternately through a bellows. Furthermore, a counter which indicates the gas consumption is also operated via the mechanism.

The bellows gas meters, which to some extent are widely installed, frequently have a specific connecting piece spacing and specific thread forms, depending on the manufacturer and area. Upwardly oriented connecting pieces or screw fixings are usual in the form of a two-pipe design, that is to say with mutually spaced inlet and outlet connecting pieces, or in the form of a single-pipe design, in which two concentric connecting pieces, one for the gas inlet, one for the gas outlet, are provided.

The measuring inserts used in known bellows gas meters operate mechanically, as explained, which results in a certain measurement inaccuracy. In the event of a defect, the entire mechanical measuring insert usually has to be replaced, which is complicated and costly, and the production costs of such bellows gas meters are also considerable anyway.

In addition to this, sensor-based gas meters are known, in which the quantity of gas is registered via an electronic measuring unit comprising a suitable sensor. However, use of such sensor-based gas meters is frequently not possible, since their housings are frequently incompatible with the pipework in the building, that is to say the gas supply and gas discharge lines, because of the connecting piece spacing or, respectively, the connection form and the thread, and requires the interposition of an adapter or complicated adaptation of the pipework in the building. The number of screw fixings in a gas installation should be kept to a minimum, however, for safety reasons; complicated conversion work is not acceptable for reasons of cost.

The invention is therefore based on the problem of specifying a gas meter which, firstly, permits extremely exact measurement but, secondly, can readily be connected to existing connecting geometries in the building.

In order to solve this problem, in a gas meter of the type mentioned at the beginning, the invention provides for the meter housing to be a bellows gas meter housing in which a measuring device comprising a housing with an integrated micro-thermal flow measuring sensor is arranged on the gas outlet, which housing is connected in a gas-tight manner to the connecting piece on the outlet side or to the meter housing in the area of the gas outlet.

In terms of its measuring principle, the gas meter according to the invention is a sensor-based meter comprising a measuring device having a measuring device housing with a micro-thermal flow measuring sensor integrated therein. However, the gas meter does not comprise a meter housing that is meter-specific or, with respect to its characteristics, designed as a sensor-based meter, but a conventional bellows gas meter housing, in which the sensor measuring device is integrated. This means that an extremely exact measuring sensor measuring device is integrated into an existing bellows gas meter and is used there instead of the mechanical bellows measuring inserts used previously. This creates a gas meter which, firstly, is able to measure extremely exactly, wherein—as compared with the mechanical bellows measuring inserts—sensor-assisted measuring devices are also able to register measured values other than just the pure flow, for example gas composition or, respectively, any contaminants, etc. Furthermore, no installation problems arise at all, since an established housing form, namely the bellows gas meter housing, is used as the meter housing. As described at the beginning, usual domestic connections are designed with regard to such meter housings, so that no adaptation problems or conversion problems arise. Furthermore, in this way very simple retrofitting of already installed bellows gas meters with mechanical measuring inserts is possible. This is because it is merely necessary to replace the mechanical measuring insert with the sensor measuring device. The sensor measuring device is designed appropriately for this purpose, in that it has a housing in which a micro-thermal flow measuring sensor is arranged, which housing can be connected in a gas-tight manner to the connecting piece on the outlet side which, for example, projects a little way into the interior of the meter, for example by means of a simple screw fixing or a corresponding mounting means. Alternatively to the attachment to the connecting piece, there is in principle also the possibility of arranging the housing directly on the meter housing, so to speak covering the gas outlet.

The gas meter according to the invention—be it as a new meter or as a meter formed by conversion—consequently permits extremely exact measurement with, at the same time, extremely simple mounting and avoiding installation problems.

For the purpose of simple connection of the measuring device housing to the connecting piece or the housing wall of the meter housing, the measuring device housing preferably has a cylindrical connecting section, via which it is connected to the likewise one cylindrical connecting section of the connecting piece, projecting into the interior of the meter housing. This can be done, for example as described, by screw fixing, since the connecting piece frequently has an external thread, onto which the measuring device housing can be screwed with an internal thread on the cylindrical connecting section and can be fixed there in a sealed manner via suitable seals.

As an alternative to fixing to the connecting piece, there is also, as described, the possibility of fixing the housing directly to the housing wall via its cylindrical connecting section, for example by means of a suitable welded or soldered connection or the like. Of course, the use of suitable mounting aids for fixing the measuring device housing, in particular to the connecting piece; is also possible, above all if the latter does not project into the interior of the housing.

The measuring device expediently comprises a pressure reducer provided in the housing and a bypass leading past the former, in which bypass the flow measuring sensor is arranged. Use is therefore made of a bypass design, which bypass is led past the pressure reducer producing a pressure loss. The pressure reducer is arranged in the cross section of the housing and has a multiplicity of through holes arranged in parallel. Only a small part of the total gas flow passes through the bypass, usually about 1%. The gas flows over the flow measuring sensor which, as a function of the flow velocity, generates a corresponding measured signal and, for example, transmits the latter with the assistance of cable or radio to an indicating device provided on the housing anyway. The flow measuring sensor itself is a micro-thermal flow measuring sensor, for example constructed using CMOS technology, which operates on the principle of thermal anemometry.

When the housing is fixed to the connecting piece, the bypass itself opens in the area of the connecting section on the connecting piece side, where a corresponding aperture is provided, through which the gas coming from the bypass flows to the gas outlet. The sensor itself is preferably arranged at the rear end of this bypass section, that is to say close to the bypass outlet, so that a sufficiently long inlet or stabilizing section is connected upstream of the sensor. Of course, however, the bypass can also open before the connecting section on the connecting piece side, so that said section does not have to be provided with an aperture. This is correspondingly true if a suitable mounting device is used to fix the measuring device or the housing, be it to or in the area of the connecting piece or to the housing wall itself.

The measuring device itself expediently communicates with an indicating unit on the housing side, for example via a data cable or via radio, if the measuring device has a suitable transmitting module and the indicating device a receiving module. Conventional bellows gas meter housings have an indicating device from the start. If the latter is an electronic indicating device, then this can readily be used as a base, which means that the sensor measured signal is provided to a control device on the side of the indicating device, which processes said signal and controls the indication. If a mechanical roller indicator is provided on the existing bellows gas meter housing, then this must either be replaced or an appropriate motorized drive which is in turn driven as a function of the sensor signal must be connected upstream.

As a consequence of the size of a bellows gas meter housing, resulting from the previous circumstance of having to integrate the relatively large-volume mechanical measuring device, there is also the possibility according to the invention of dividing the meter housing into an upper and a lower housing section, which are separated from each other in a gas-tight manner. The gas inlet and the gas outlet and the measuring device are provided in the upper housing section. Then, in a development of the invention, a transmitting and receiving device used for the wire-free reception and the wire-free transmission of data, in particular measured data, can be arranged in the lower housing section, separated in a gas-tight manner. This transmitting and receiving device can transmit existing measured data in a wire-free manner to an external receiving point, so that it is not necessary to perform the reading on site. Ultimately, barely any limits are placed with regard to the data to be transmitted. It is of course possible for the actual useful data, that is to say picked up by the actual sensor measuring device, to be given to this transmitting and receiving device and to be transmitted thereby in the same way as this transmitting and receiving device can also receive measured data centrally from other metering devices installed in the building, such as from water, power or heat meters, and pass it on to the external reading point. This means that the gas meter according to the invention is, so to speak, used as a "data center" present within a metering system present in a building and comprising a plurality of separate meters. In order to be able to transmit the measured data in a straightforward manner, the housing in the area of the lower housing section is expediently fabricated from plastic, while the upper housing section consists of metal, and also the dividing wall is fabricated from metal in order to ensure the high temperature resistance in the area in which the gas flows but, on the other hand, also to ensure a high radiated power out of the lower housing section.

Finally, in a further development of the invention, a control valve that can preferably be controlled via a radio signal can be provided, via which the gas supply to or from the gas meter can be shut off. Such a control valve makes it possible to shut off the gas flow as required, for example when the previous gas customer is no longer to be supplied by the supplier. In particular if the control valve can be controlled via a radio signal, for which purpose an individual receiver, for example, is assigned thereto, for which, however, the transmitting and receiving device present in the lower housing section can also be used, and actuation of the control valve initiated from outside is possible. However, it is also conceivable, if control via a radio signal is not possible, for the reader to actuate the control valve on site, for example after he has entered an authorization code on a display input on the indicating device, after which he can issue the shut-off signal. The control valve can, for example, be provided on the housing of the measuring device, so that the measuring device can therefore be produced as a completely pre-configurable module comprising housing, pressure reducer, sensor together with any connecting or radio means and the control valve together with connecting or radio means.

In addition, the invention further relates to a measuring device for a gas meter of the type described, comprising a preferably cylindrical housing, in which a pressure reducer and a bypass leading past the latter and in which a micro-thermal flow measuring sensor is arranged, is provided, and on which housing connecting or communicating means for connecting or communicating with an external indicating or data transmitting device are provided. The measuring device is therefore a finally configured component, which can be inserted as such into an existing bellows gas meter housing. If a cable link has to be laid between the measuring device or the sensor and the indicating or data transmitting device, then appropriate connecting means, to which such a cable can be connected, are provided on the housing. If the measuring device is designed for wire-free communication with the indicating device or the data transmitting device, then a suitable transmitter, if appropriate a combined transmitting and receiving device if bidirectional data is to be transmitted, is provided as a communication means.

Figure 2:
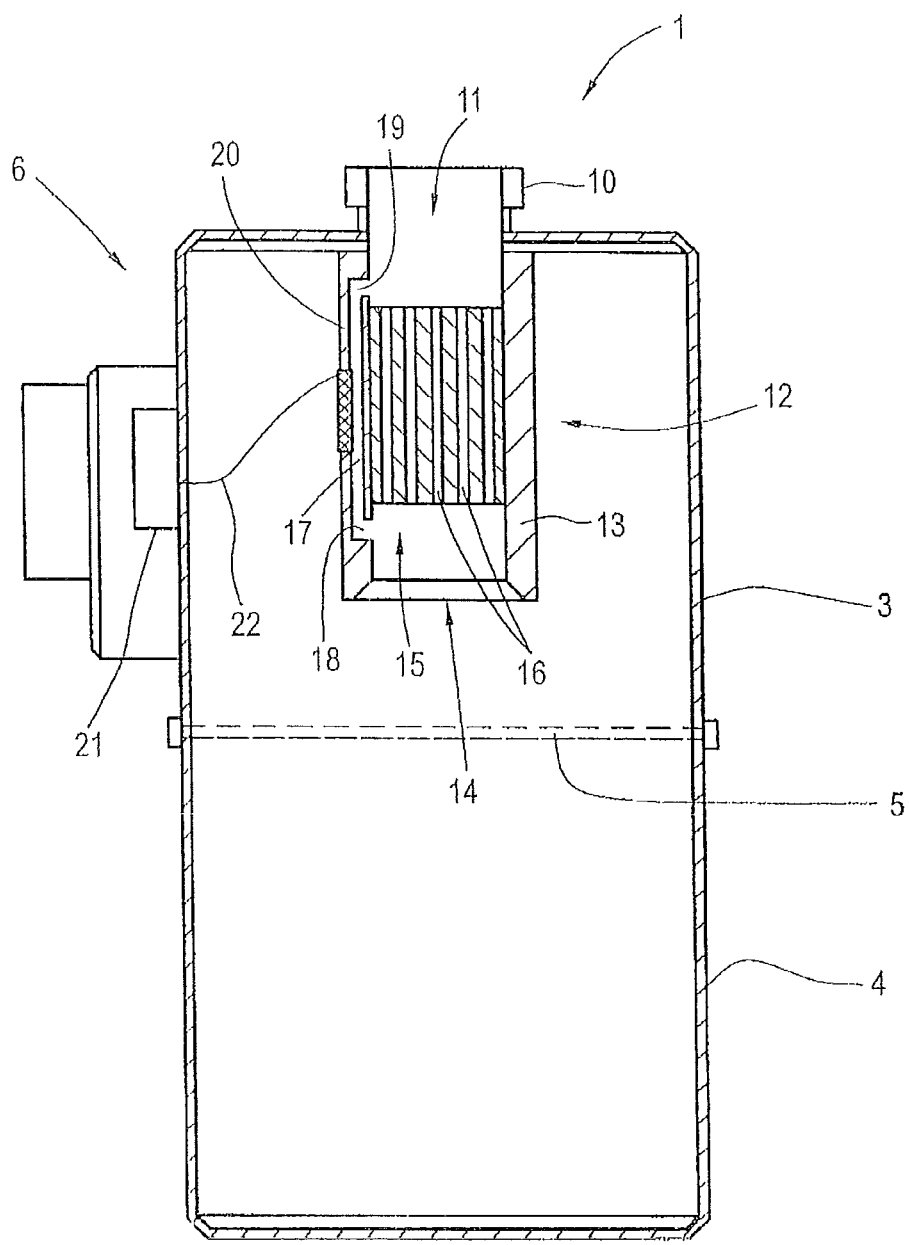
Figure 3:
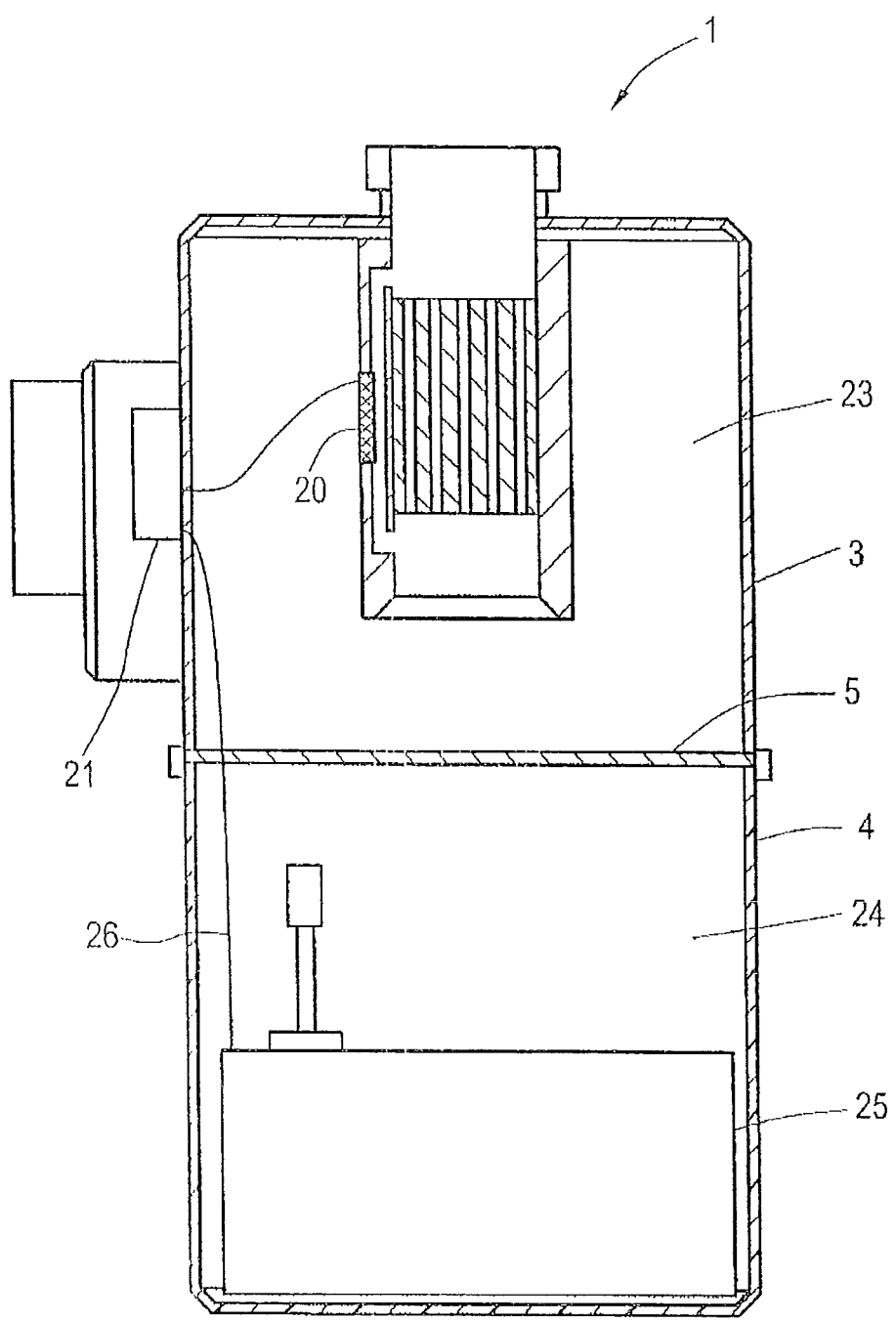

Further advantages, features and details of the invention can be gathered from the exemplary embodiment described below and by using the drawings, in which:

FIG. 1 shows a basic illustration of a gas meter according to the invention, partly in section, FIG. 2 shows a cross-sectional view through the gas meter from FIG. 1, and FIG. 3 shows a cross-sectional view corresponding to FIG. 2 through a gas meter of a second embodiment.

FIG. 1 shows a gas meter according to the invention, comprising a bellows gas meter housing 2, which is either a new housing if the gas meter 1 is a new device, or which is an old housing already installed on site or to be reconditioned, if an original bellows gas meter already originally operated is to be updated. The bellows gas meter housing 2 comprises an upper housing section 3 and a lower housing section 4, which—see FIG. 2—can possibly be separated via a dividing wall 5 (shown dashed). Both housing sections 3, 4 and the possible dividing wall 5 in the exemplary embodiment shown consist of metal, are therefore sheet metal components.

Located on the front side of the upper housing section is an indicating device 6, for example an indicating display 7, on which measured consumption values can be displayed.

Likewise located on the upper housing section 3 is a connecting piece 8, to which an gas supply line is to be connected, which means that the gas inlet 9 is located there. Located at a distance and on the other housing section side is a second connecting piece 10, to which the gas discharge line is connected, which means that the gas outlet 11 is located here. Gas inlet and gas outlet are illustrated by the respective arrows.

Connected upstream of the gas outlet 11 is the measuring device 12, which is a sensor-based measuring device. The measuring device 12 has a cylindrical metal housing 13, for example, which has a through hole 14 which permits the passage of gas. Arranged in the interior of the housing 13, covering the cross section, is a pressure reducer 15, which has a multiplicity of parallel passage holes 16.

Also formed in the wall of the housing 13 is a bypass 17, which leads around the pressure reducer 15. This means that the inlet 18 of the bypass opens into the through hole 14 underneath the pressure reducer 15 and the outlet 19 of the bypass opens into the through hole 14 above the pressure reducer 15.

In or on the bypass 17 there is arranged a micro-thermal flow measuring sensor 20, such that gas flowing through the bypass flows past the flow measuring sensor 20. The latter measures the quantity of gas flowing past as a function of the flow velocity, from which the total gas consumption is derived.

The micro-thermal flow measuring sensor is a sensor using CMOS technology, which functions in accordance with the hot wire method, i.e. it operates in accordance with the measuring principle of thermal anemometry. The sensor is heated electrically via the heating wire, for which purpose a suitable energy source, for example a battery or the like, which is not specifically shown here, is used. The electrical resistance of the sensor changes as a function of the temperature. As a result of the gas flowing around the sensor, transport of heat into the gas flowing past takes place. This transport of heat is correlated with the flow velocity. By measuring the electrical resistance, it is consequently also possible to draw conclusions about the flow velocity and, via the latter in conjunction with the known volume or cross section of the bypass, about the total gas flow.

The flow measuring sensor 20 communicates with the indicating device 6 which, for example, as indicated in FIG. 2, comprises a control device 21, for example a suitable processor. This processor evaluates the measured signals from the flow measuring sensor 20 and determines the actual flow and, respectively, the cumulative consumption, which is then output on the display 7. The communication between the flow measuring sensor 20 and the control device 21 in the example shown is carried out via a cable link 22.

However, a wire-free link would also be conceivable, which means that a transmitter would be present on the flow measuring sensor 20 and a receiver would be present on the control device 21 or assigned to the latter and exchange the measured data.

The housing 13, that is to say the measuring device 12 as a whole, is arranged in a gas-tight manner around the gas outlet 11, so that it is ensured that the gas can flow to the gas outlet 11 only through the measuring device 12. Different fixing possibilities are conceivable for this purpose. If the connecting piece 10 projects a short way into the interior of the upper housing section 3 with a cylindrical connecting section, for example provided with an external thread, there is the possibility of screwing the housing 13 onto the connecting piece connecting section via an internal thread arranged in the upper region of the former, likewise representing a connecting section. The bypass outlet 19 opens into the connecting piece 10 via a suitable aperture in the connecting section of the latter. As an alternative to this, it is certainly also conceivable to fix the housing 13 in a gas-tight manner either to the connecting piece 10 or the upper top wall of the housing section 3 itself via a suitable mounting device (that is to say an appropriately configured mechanical fixing component). There, if required, it can even be welded on or soldered on. Irrespective of how the fixing of the measuring device 12 is actually carried out, the latter must in every case be positioned in a gas-tight manner around the gas outlet 11. This arrangement can be made in the same way as described both in the case of a new housing and in the case of an old housing.

Although not shown in FIGS. 1 and 2, there is also the possibility of providing a control valve that can be activated by a radio signal, via which the gas outlet can be closed. This control valve can, for example, be integrated into the housing 13 of the measuring device 12; it can be connected upstream or downstream of the pressure reducer 15. Via said control valve, the gas supply can be closed completely if required.

FIG. 3 shows a further embodiment of a gas meter 1 according to the invention, which, in terms of construction, to this extent corresponds to the gas meter 1 from FIGS. 1 and 2. However, in this configuration, the lower housing section 4 is fabricated from plastic and separated from the upper housing section 3 via the metallic dividing wall 5. This means that two volumes 23, 24, separated from each other, result. A transmitting and receiving device 25 is arranged in the lower housing section 4. This can be, for example, a LAN-GPRS receiver, which is used to receive meter data in the near radio range (ISM band), to store meter readings and to pass on this data via GSM, GPRS or LAN. Via this transmitting and receiving device 25, it is therefore possible, for example, for the measured signals picked up from the actual flow measuring sensor 20 and, respectively, the measured data determined by the control device 21 to be transmitted to an external reading or receiving point by radio, for which purpose, in the example shown, the control device 21 communicates with the transmitting and receiving device 25 via a cable link 26. However, a radio link would also be conceivable.

However, the transmitting and receiving device 25 is also used to receive measured data from other meters installed in the building, such as water, power or heat meters, in a wire-free manner and, if required, to transmit said data to an external reading point by radio. The external meters have a suitable transmitting unit, which transmits the measured data to the transmitting and receiving device 25. The latter serves, so to speak, as a "data center" in the building, which collects all the measured data arising in the building and transmits said data to the reading point (in case of different suppliers, also to different reading points) in a wire-free manner. Of course, suitable cable lead-throughs are provided in the lower housing section 4 for the power supply and the LAN connection and the like for the transmitting and receiving device 25, although not specifically shown here.

Making the lower housing section 4 from plastic permits a high radiated power, in order also to be able to transmit the data over great distances. The simple integration of the transmitting and receiving device 25 in the lower housing section 4 requires no additional effort on installation on site, instead the transmitting and receiving device 25 can be integrated in a straightforward manner. Equally simple, even on site, is the replacement of the lower, originally metal, section with a housing section made of plastic, in order to integrate the transmitting and receiving device 25.

The invention claimed is:

1. A gas meter comprising a meter housing with a gas inlet with associated connecting piece for a gas supply line and a gas outlet with associated connecting piece for a gas discharge line, wherein the meter housing is a bellows gas meter housing in which a measuring device comprising a housing with an integrated micro-thermal flow measuring sensor is arranged on the gas outlet, which housing is connected in a gas-tight manner to the connecting piece on the outlet side or to the meter housing in the area of the gas outlet.

2. The gas meter as claimed in claim 1, wherein the housing has a cylindrical connecting section, via which it is connected to the likewise one cylindrical connecting section of the connecting piece, projecting into the interior of the meter housing, or directly to the housing wall having the gas outlet.

3. The gas meter as claimed in claim 1, wherein a pressure reducer is arranged in the housing and a bypass leading past the former is provided in which bypass the flow measuring sensor is arranged.

4. The gas meter as claimed in claim 3, wherein the bypass opens in the area of the connecting section on the connecting piece side and if appropriate communicates with an aperture in the connecting section on the connecting piece side or directly with the gas outlet.

5. The gas meter as claimed in claim 1, wherein the measuring device communicates with an indicating unit on the housing side.

6. The gas meter as claimed in claim 1, wherein the meter housing has an upper housing section containing the gas inlet and the gas outlet and the measuring device, and a lower housing section separated from the former in a gas-tight manner and in which a transmitting and receiving device used for the wire-free reception and the wire-free transmission of data is provided.

7. The gas meter as claimed in claim 6, wherein the upper housing section consists of metal and is separated from the lower housing section in a gas-tight manner via a dividing wall consisting of metal, while the lower housing section consists of plastic.

8. The gas meter as claimed in claim 1, wherein a control valve that can preferably be controlled via a radio signal is provided, via which the gas supply to or from the gas meter can be shut off.

9. The gas meter as claimed in claim 8, wherein the control valve is provided on the housing of the measuring device.

10. A measuring device for a gas meter as claimed in claim 1, comprising a preferably cylindrical housing, in which a pressure reducer and a bypass leading past the latter and in which a micro-thermal flow measuring sensor is arranged, is provided, and on which housing connecting or communicating means for connecting or communicating with an external indicating or data transmitting device are provided.

11. The gas meter as claimed in claim 6, wherein said data is measured data.

* * * * *